(12) United States Patent
Johnson et al.

(10) Patent No.: US 8,646,547 B1
(45) Date of Patent: Feb. 11, 2014

(54) CHISEL ICE DRILL

(76) Inventors: John E. Johnson, Daleville, IN (US);
Eric E. Crowe, Daleville, IN (US)

( * ) Notice: Subject to any disclaimer, the term of this patent is extended or adjusted under 35 U.S.C. 154(b) by 521 days.

(21) Appl. No.: 12/696,128

(22) Filed: Jan. 29, 2010

(51) Int. Cl.
*F25C 5/04* (2006.01)

(52) U.S. Cl.
USPC ............. 175/18; 175/170; 175/382; 175/388; 241/278.1; 408/224

(58) Field of Classification Search
USPC ........... 175/18, 170, 382, 388, 394, 323, 397, 175/421; 408/214, 211, 224, 225, 227, 228, 408/230; 241/278.1, 282.1, 297
See application file for complete search history.

(56) References Cited

U.S. PATENT DOCUMENTS

| | | | | |
|---|---|---|---|---|
| 2,485,123 A | * | 10/1949 | West | 175/18 |
| 2,689,131 A | * | 9/1954 | Priest | 279/101 |
| 2,854,218 A | | 9/1958 | Hedrick et al. | |
| 2,982,364 A | * | 5/1961 | Vincent | 175/18 |
| 3,865,320 A | * | 2/1975 | Bowles | 241/278.1 |
| 4,488,605 A | | 12/1984 | Ruppel et al. | |
| 5,213,170 A | * | 5/1993 | Savitski | 175/323 |
| 5,251,707 A | | 10/1993 | Grahl | |
| 5,950,738 A | * | 9/1999 | Caswell et al. | 175/18 |
| 6,227,774 B1 | | 5/2001 | Haughton et al. | |
| 6,502,649 B1 | | 1/2003 | Havel | |
| 2002/0129975 A1 | | 9/2002 | Barta | |
| 2004/0240954 A1 | | 12/2004 | Chilcott | |
| 2005/0205298 A1 | * | 9/2005 | Kollasch et al. | 175/18 |
| 2006/0254818 A1 | | 11/2006 | Pepple | |

* cited by examiner

*Primary Examiner* — Yong-Suk (Philip) Ro
(74) *Attorney, Agent, or Firm* — Robert C. Montgomery; Montgomery Patent & Design

(57) ABSTRACT

A spade-type drilling tool designed for drilling holes within an ice surface for the purposes of ice fishing, comprising a spade end which is welded onto the end of a shaft. The length of the shaft is sufficient to provide an ergonomically comfortable posture for a user while drilling the fishing hole. A first side of the lower end of the spade comprises a straight knife edge, while a second opposite side is provided with a plurality of sharp cutting teeth. A sharp pointed bit, protruding beyond the lower line of the knife edge and the teeth, is located on a vertical centerline along the faces of the spade. The sharp point of the bit is intended to provide a means for punching a starter hole within the ice, and subsequently, to function as a pilot during the progressing drilling operation. The tool is provided with a circular shield, designed to slip over and clamp onto the shaft, thereby preventing water and ice particles from splashing back up onto the user.

7 Claims, 6 Drawing Sheets

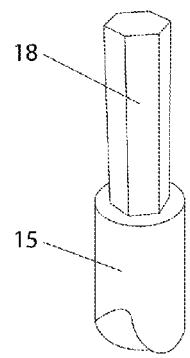
Fig. 2c
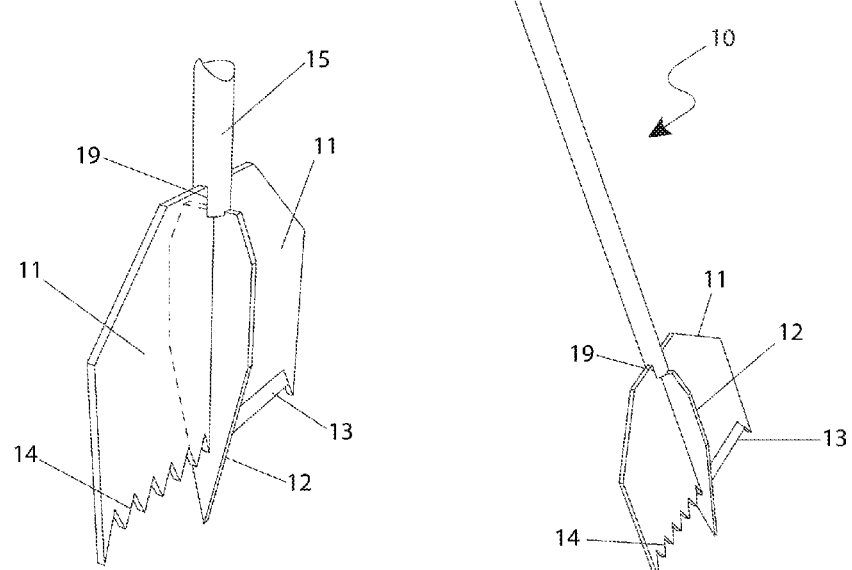
Fig. 2d
Fig. 2b

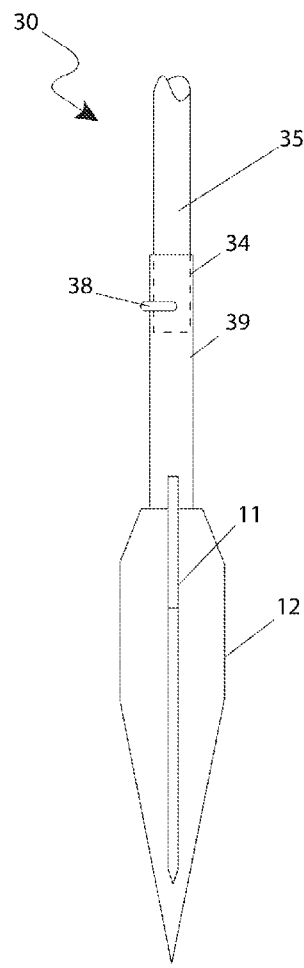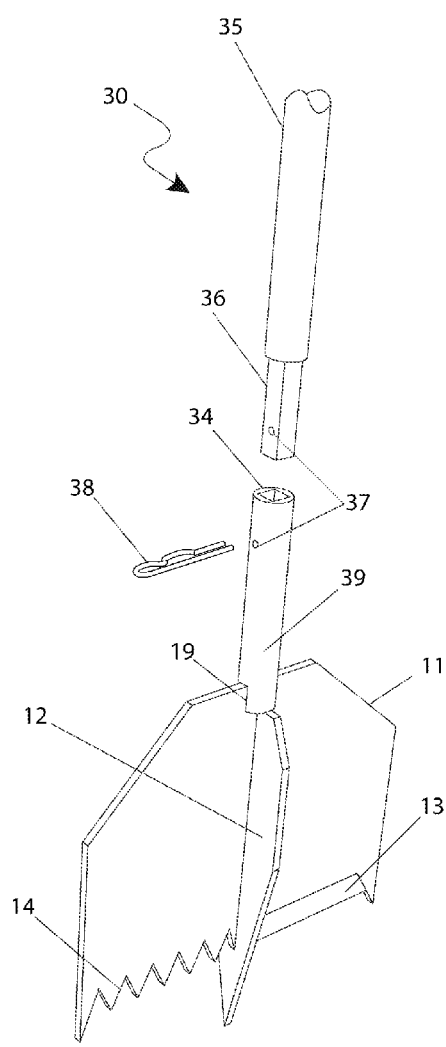
Fig. 3b
Fig. 3a

CHISEL ICE DRILL

RELATED APPLICATIONS

The present invention was first described in an Official Record of Invention on Feb. 18, 2009, that is on file at the offices of Montgomery Patent and Design, LLC, the entire disclosures of which are incorporated herein by reference.

FIELD OF THE INVENTION

The present invention relates generally to ice fishing, and in particular, to a drill bit adapted for drilling holes in ice for purposes of ice fishing.

BACKGROUND OF THE INVENTION

Fishing in general is a leisure activity of increasing popularity and participation worldwide. In particular, ice fishing is a sport being enjoyed more and more often for the calmness, serenity, and satisfaction associated with the activity. Ice fishing presents many problems and facets unique from other common forms of fishing, such as the skill of choosing locations and forming holes in the ice.

Obviously, the process of forming a hole in the ice is integral to the process of ice fishing. Longstanding methods of forming holes in the ice, such as the use of hand augers, require nontrivial amounts of time and effort. The process of forming holes can quickly become tedious when repeated several times over during the process of preparing for ice fishing in multiple locations or when changing locations for purposes of perceived increased productivity in fishing. Other methods, such as gas-powered ice drills, are tedious in the time spent preparing and transporting the device, as well as cost-prohibitive for repeated use.

Various attempts have been made to provide tools for drilling holes in hard surfaces. Examples of these attempts can be seen by reference to several U.S. patents. U.S. Pat. No. 2,854,218, issued in the name of Hedrick et al., describes an ice shaving drill bit. The Hedrick device utilizes the rotary motion of a power drill to shave a hole in the ice in a smooth fashion.

U.S. Pat. No. 4,488,605, issued in the name of Ruppel et al., describes an extendible shank auger. The Ruppel device is a hand-driven auger which allows a user to drill a hole in a surface such as ice.

U.S. Pat. No. 6,227,774, issued in the name of Haughton, describes a spade drill bit. The Haughton device resembles a common spade-type drill bit adapted for use with a power drill which allows a user to form a round hole of a desired width.

While these devices fulfill their respective, particular objectives, each of these references suffer from one (1) or more of the aforementioned disadvantages. Many such devices are not suitably adapted to provide gripping and scraping functions which are advantageous for drilling through ice. Also, many such devices are not adapted for simple use with existing technologies such as power drills. Furthermore, many such devices do not employ a method which provides a user with easy initial puncturing and subsequent quick boring through an ice surface. In addition, many such devices do not provide an integral means to help protect a user from spray ice debris during the process of ice drilling. Accordingly, there exists a need for device suitably adapted for drilling holes through ice for purposes of ice fishing without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to quickly, cheaply, and effectively drill holes through ice for purposes of ice fishing in a manner which is safe and easily manageable by a single user. Thus, the object of the present invention is to solve the aforementioned disadvantages and provide for this need.

To achieve the above objectives, it is an object of the present invention to comprise a shaft, a spade connected to the shaft, a bit connected to the shaft and spade, and a cordless drill. The spade comprises a knifed edge and a toothed edge formed on opposite edges.

Another object of the present invention is to further comprise a splash shield attached to the shaft. The splash shield further comprises a fastener which allows a user to adjustably, removably attach the splash shield to the shaft. The fastener comprises a common fastening means such as a thumb screw or the like.

Yet still another object of the present invention is to comprise an upper portion of the shaft of a hexagonal end which provides a positive grip to the cordless drill. A lower portion of the shaft comprises a slot which is adapted to securely straddle an upper portion of the spade.

Yet still another object of the present invention is to comprise a drive hub with a drive socket, a plurality of pin apertures, and a pin. The drive socket is located within the slot which straddles the spade. The shaft further comprises a drive end which fits removably within the drive socket. Pin apertures are located within both the drive end and drive socket, such that a user may securely lock the spade into place at the end of the shaft by placing the pin through the pin apertures when the drive end is placed in the drive socket.

Yet still another object of the present invention is to permanently affix the bit to front and rear portions of the spade via welding.

Yet still another object of the present invention is to comprise the knife edge of a knife edge insert to be removably fastened onto a front face portion of the spade. The toothed edge is comprised of a toothed edge insert removably fastened onto a rear face portion of the spade.

Yet still another object of the present invention is to provide the spade having a serpentine shape with a first curvature in a forward direction and a second curvature curved in an opposite rearward direction. The curvatures are separated by the bit, with the knife edge fastened on an outside portion of the first curvature and the toothed edge fastened on an outside portion of the second curvature.

Yet still another object of the present invention is to provide a method of utilizing the device that provides a unique means of utilizing the drill bit in conjunction with the cordless drill, attaching the splash shield, puncturing the ice to provide an initial drilling point, and quickly and efficiently drilling a hole in the ice for purposes of ice fishing.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2B is a perspective view of the chisel ice drill 10, according to a preferred embodiment of the present invention;

FIG. 2C is a perspective view of an upper end of a shaft 15 of the chisel ice drill 10, according to a preferred embodiment of the present invention;

FIG. 2D is a perspective view of a spade bit 11 of the chisel ice drill 10, according to a preferred embodiment of the present invention;

FIG. 3A is a perspective front view of a chisel ice drill 30, according to a first alternate embodiment of the present invention;

FIG. 3B is an elevation side view of a chisel ice drill assembly 30, according to the first alternate embodiment of the present invention;

DESCRIPTIVE KEY

| | |
|---|---|
| 10 | chisel ice drill |
| 11 | spade |
| 12 | bit |
| 13 | knife edge |
| 14 | toothed edge |
| 15 | shaft |
| 16 | splash shield |
| 17 | thumb screw |
| 18 | hexagonal end |
| 19 | slot |
| 20 | cordless drill |
| 30 | first alternate chisel ice drill |
| 34 | drive socket |
| 35 | drive shaft |
| 36 | drive end |
| 37 | pin aperture |
| 38 | pin |
| 39 | drive hub |
| 40 | second alternate chisel ice drill |
| 41 | alternate spade |
| 42 | alternate hub |
| 43 | knife edge insert |
| 44 | toothed edge insert |
| 50 | third alternate chisel ice drill |
| 51 | curved spade |
| 53 | curved knife edge insert |
| 54 | curved toothed edge insert |
| 55 | first curvature |
| 56 | second curvature |
| 57 | flat space |
| 60 | user |
| 61 | ice surface |
| 62 | fishing aperture |
| 63 | starting aperture |

DETAILED DESCRIPTION OF THE PREFERRED EMBODIMENT

Figure 1:
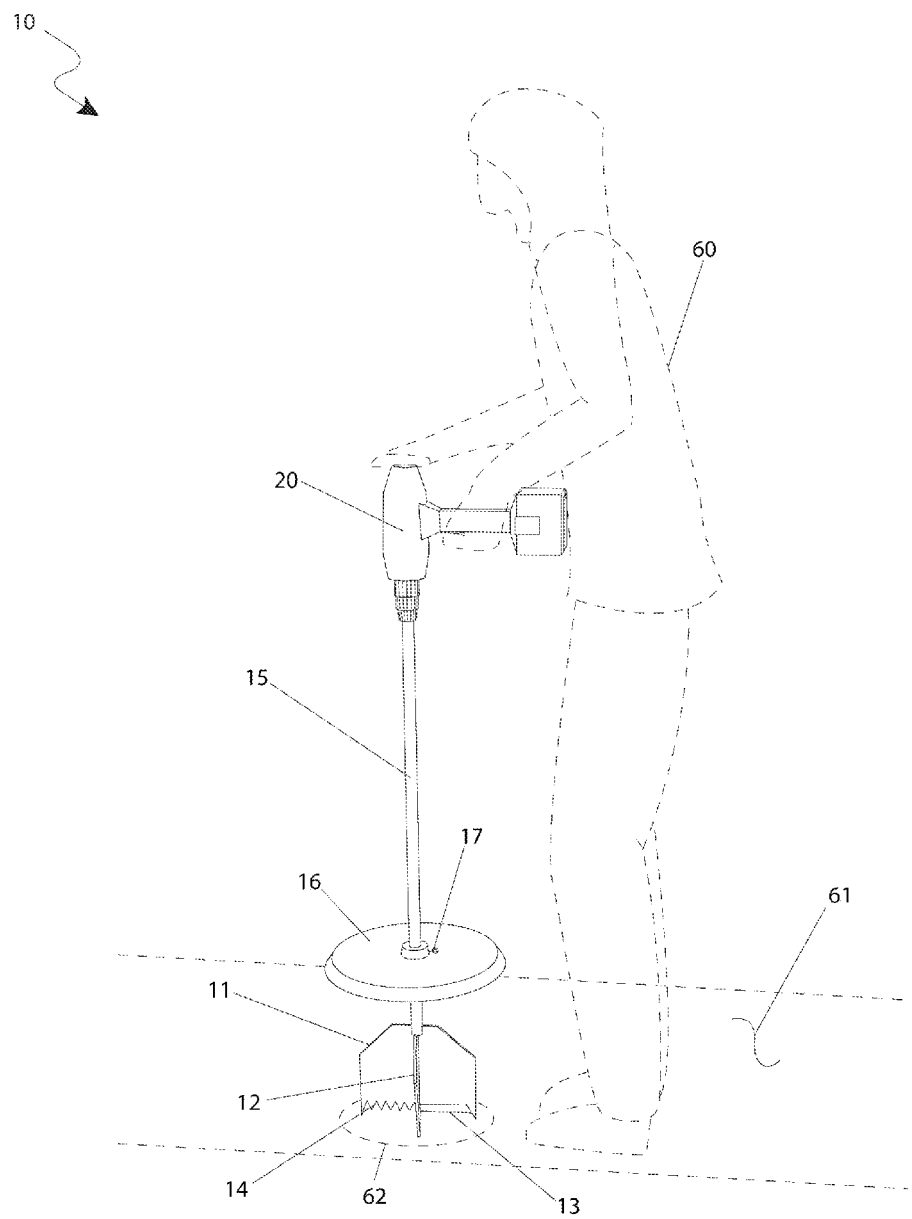
FIG. 1 is an environmental view of a chisel ice drill 10 in an operational state, according to a preferred embodiment of the present invention.

The best mode for carrying out the invention is presented in terms of its preferred embodiment, herein depicted within FIGS. 1 through 2D, and in terms of its alternate embodiments, herein depicted within FIGS. 3A through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a chisel ice drill 10 (herein described as the "device") 10, which provides a means for drilling ice fishing apertures.

Referring now to FIG. 1, an environmental view of the device 10 in operation, according to the preferred embodiment of the present invention, is disclosed. The device 10 is depicted as driven by a cordless drill held and operated by a user 60 while drilling an ice fishing aperture 62 therewithin an ice surface 61.

Figure 2A:
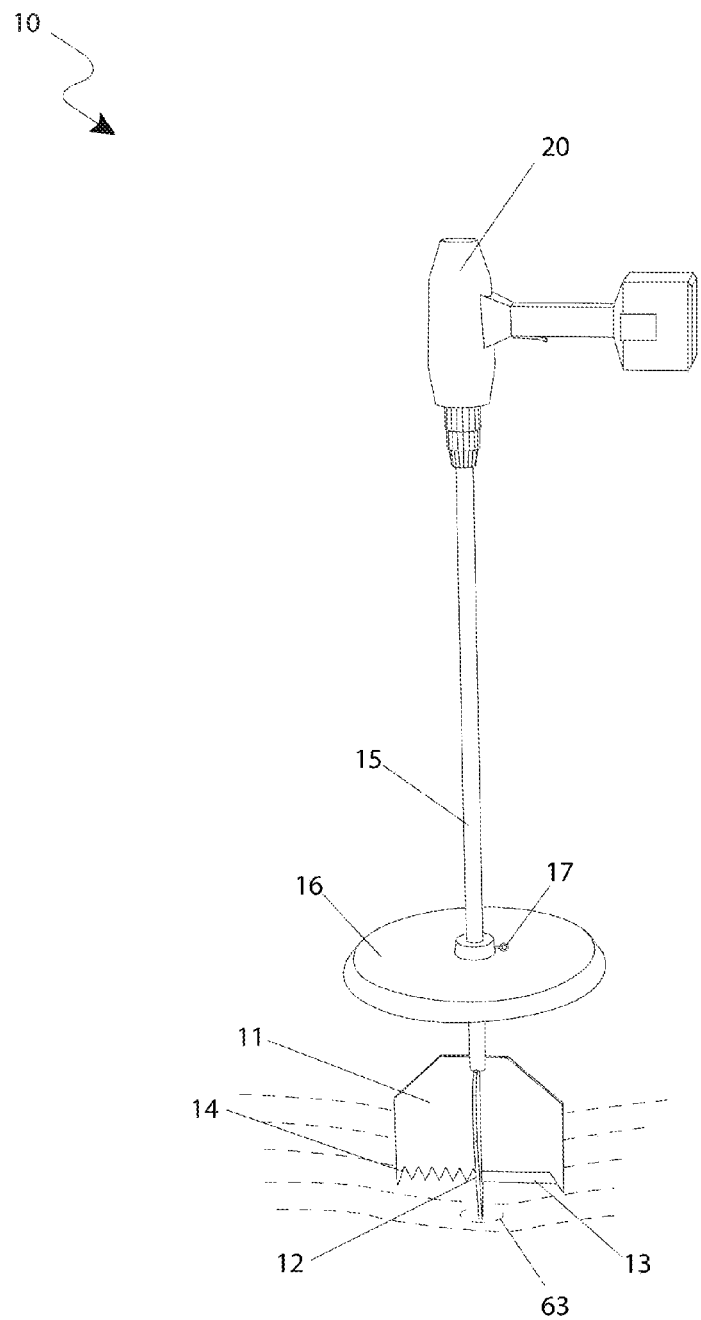
FIG. 2A is an elevation view of the chisel ice drill 10 assembly, according to a preferred embodiment of the present invention.

Referring now to FIG. 2A, an elevation view of the device 10 assembly, according to the preferred embodiment of the present invention, is disclosed. The device 10 assembly comprises a spade 11, a shaft 15 a splash shield 16, and a cordless drill 20. The elevation of the splash shield 16 therewithin the length of the integral shaft 15 is envisioned to be secured by means of the pressure of a thumb screw 17 thereagainst the surface of the shaft 15. The splash shield 16 is envisioned to be made of a material such as, but not limited to: plastic, rubber, fiberglass, plywood or fiberboard, and to comprise a bulbous safety edge.

Referring now to FIG. 2B, a perspective view of the device 10, according to the preferred embodiment of the present invention, is disclosed. The device 10 comprises the spade 11, a bit 12, a knife edge 13, a toothed edge 14 and a shaft 15. An upper end portion of the shaft 15 comprises a hexagonal end 18, intended to provide a positive grip for the chuck of the cordless drill 20. A lower end portion of the shaft 15 is provided with a slot 19 intended to achieve a tight fit over the thickness of the material of the spade 11.

Referring now to FIG. 2C, an enlarged perspective view of the upper end portion of the shaft 15 of the device 10, according to the preferred embodiment of the present invention, is disclosed. This FIG. 2C is intended to show more clearly the hexagonal end 18 of the shaft 15.

Referring now to FIG. 2D, an enlarged perspective view of the spade 11 portion of the device 10, according to the preferred embodiment of the present invention, is disclosed. The spade 11 portion comprises a bit 12, a knife edge 13, a toothed edge 14, and an integral shaft 15. It is envisioned that the bit 12, comprising a sharply pointed lower portion, is welded thereonto front and rear face portions of the spade 11, and is used to punch a starter aperture 63 as a first step in the process of drilling the fishing aperture 62 thereinto the ice surface 61, while subsequently serving as a pilot therewithin the progression of the drilling operation. The slot 19 therewithin the lower end portion of the shaft 15 straddles the upper portion of the spade 11 and is welded thereonto. The shaft 15 and the spade 11 are envisioned to be made of materials such as, but not limited to: stainless steel, tool steel, or plow steel.

Referring now to FIG. 3A, an enlarged perspective view of the spade 11 portion of a device 30, according to a first alternate embodiment of the present invention, is disclosed, wherein the spade 11, the bit 12, the knife edge 13, toothed edge 14 and the shaft upper end 18 are the same as those comprised within the device 10 of the preferred embodiment. Additionally, the device 30 comprises a drive hub 39 wherein the slot 19 provided therewithin lower end portion straddles the upper portion of the spade 11 and is welded thereonto. The drive hub 39 further comprises a drive socket 34 designed to receive a snuggly fitting drive end 36 of the drive shaft 35. A pin 38, inserted thereinto a pin aperture 37 ensures that the spade 11 is securely locked thereonto the end of the shaft 35. The modular configuration of the device 30 provides a means for installing various spade 11 sizes thereonto the same drive shaft 35, thereby eliminating the necessity of providing each different spade 11 size with an individual integral shaft 15.

Referring now to FIG. 3B, an elevation side view of the device 30 in an assembled state is depicted, according to the first alternate embodiment of the present invention, is disclosed. The drive end 36 of the shaft 35 is depicted as inserted within the drive socket 34, and secured by means of the safety pin 38.

Figure 4:
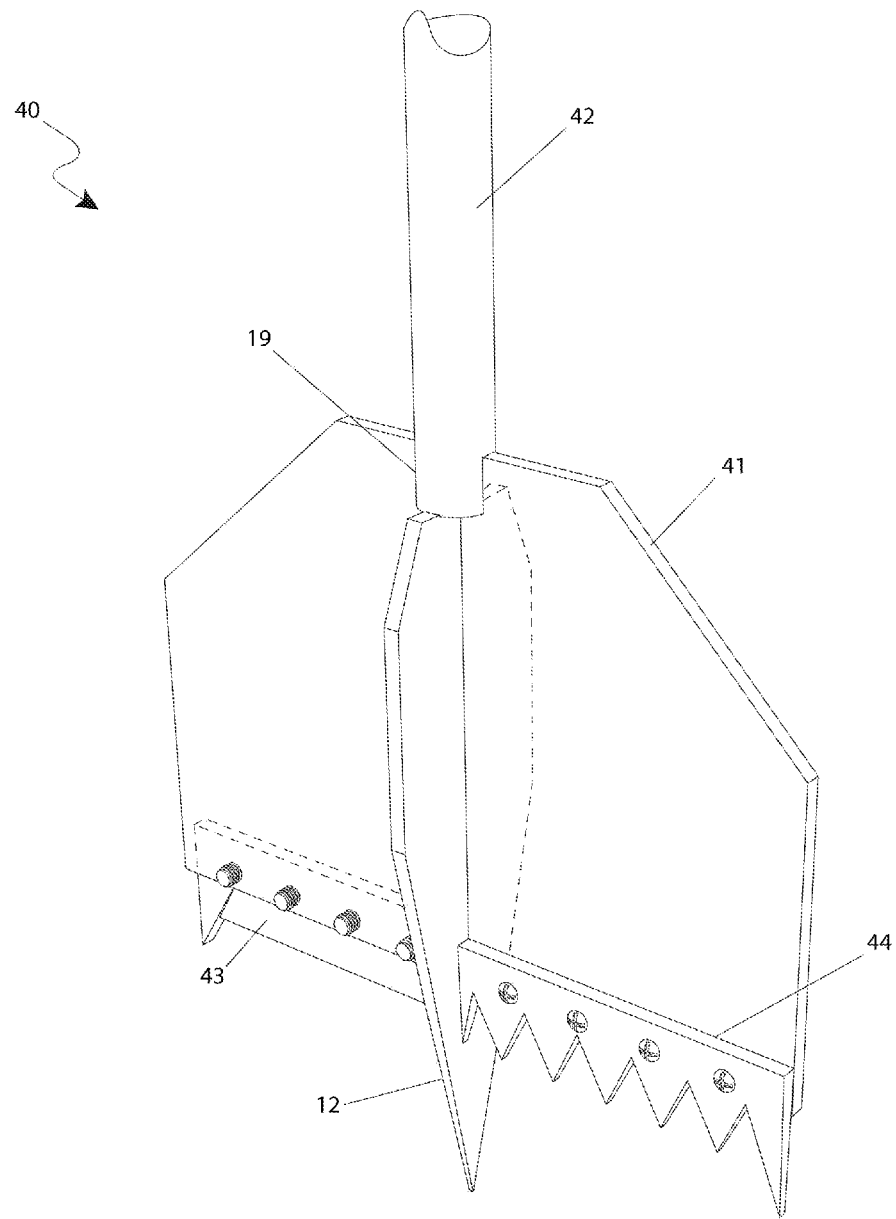
FIG. 4 is a perspective rear view of a chisel ice drill 40, according to a second alternate embodiment of the present invention; and, FIG. 5 is a perspective rear view of a chisel ice drill 50, according to a third alternate embodiment of the present invention.

Referring now to FIG. 4, a perspective rear view of a device 40, according to a second alternate embodiment of the present invention, is disclosed. The device 40 comprises an alternate spade 41, an alternate hub 42, the bit 12 welded thereonto the front and rear portions of the alternate spade 41, a knife edge insert 43, and a toothed edge insert 44. The alternate hub 42 is envisioned to be of a configuration which is similar to either the lower portion of the integral shaft 15 or to the drive hub 39. The knife edge insert 43 is removably fastened thereonto a front face portion of the spade 41, while the toothed edge insert 44 is removably fastened thereonto a rear face portion of the spade 41. The removable design of the knife edge insert 43 and of the toothed edge insert 44 is intended to make said inserts 43 and 44 more easy to re-sharpen.

Figure 5:
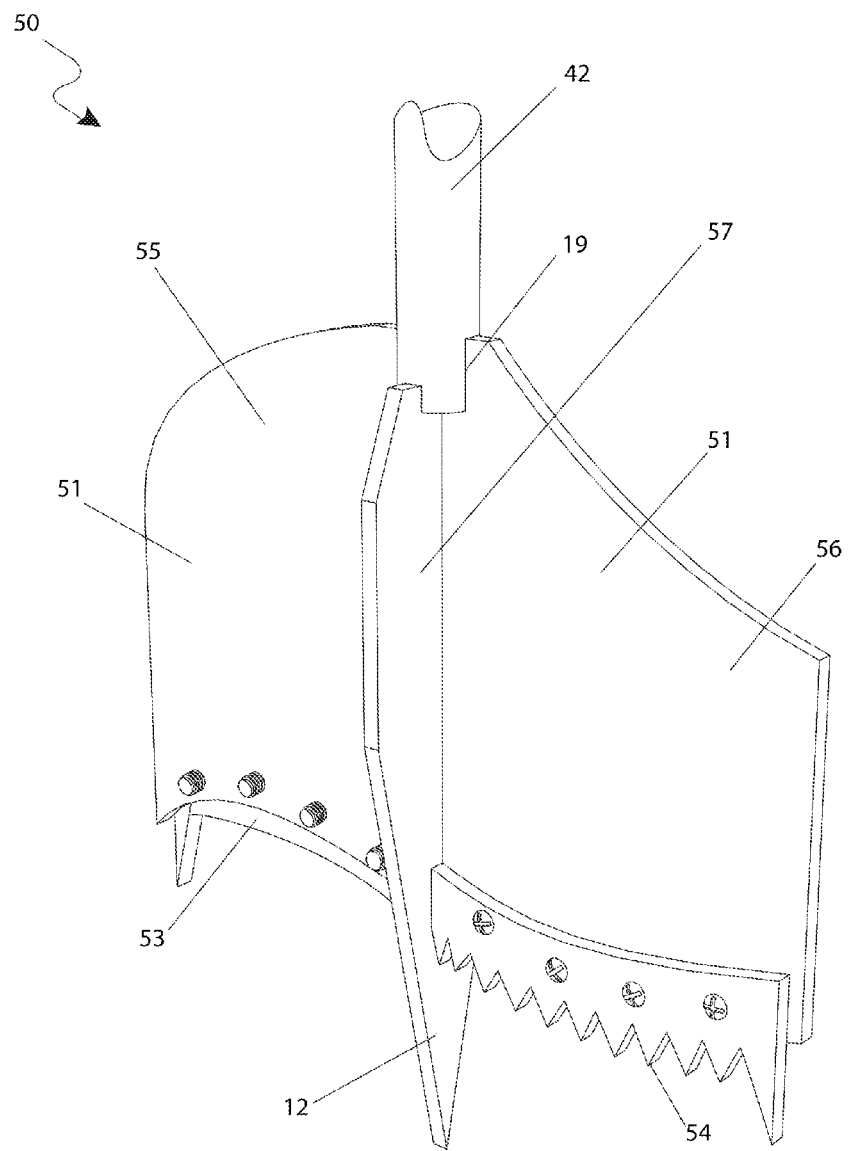

Referring now to FIG. 5, is a perspective rear view of a device 50, according to a third alternate embodiment of the present invention, is disclosed. The spade 51 of the device 50 is formed thereinto an "S"-shaped configuration, comprising a first curvature 55 curved in a forward direction, and a second curvature 56 curved in an opposite rearward direction, wherein the curvatures 55 and 56 are separated by a flat space 57. A correspondingly curved knife edge insert 53 is removably fastened thereonto the outside portion of the first curvature 55, while a correspondingly curved toothed edge insert 54 is removably fastened thereonto the outside portion of the second curvature 56 of the spade 51. The flat space 57 allows the alternate hub 42 and the bit 12 to be welded thereonto a central location between the first curvature 55 and the second curvature 56. The alternate hub 42 is envisioned to be of a configuration which is similar to either the lower portion of the integral shaft 15, or to the drive hub 39. The removable design of the knife edge insert 53 and of the toothed edge 54 provides a means for re-sharpening. The first curvature 55 and the second curvature 56 provide a longer line of contact between the ice surface 61 and the knife edge insert 53, while providing the additional space to allow an increased plurality of teeth within the toothed insert 54, thereby reducing the specific load within each element in contact with the ice surface 61 while drilling the ice aperture 62.

It is envisioned that other styles, sizes, and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be assembled as indicated within FIGS. 1 and 2.

The method of utilizing the device 10 may be achieved by performing the following steps: procuring the desired size device 10 and an adequately powered cordless drill 20; checking the sharpness of the knife edge 13 and of the teeth comprised within the toothed edge 14; re-sharpening, if necessary; assembling the splash shield 16 thereonto the shaft 15; inserting the upper end 18 of the shaft 15 thereinto the chuck of the cordless drill 20; using the assembled device 10 as a means of assisting in a safe walk to the desired location on the ice surface 61; choosing a favorable spot for drilling a fishing aperture 62; punching a starting aperture 63 for the fishing aperture 62 by inserting the point of the bit 12 thereinto the ice surface 61; operating the cordless drill 20; inserting the bit 12 of the spinning device 10 into the punched starting aperture 63; lowering the device 10 to allow the knife edge 13 and the toothed edge 14 to contact the ice surface 61; allowing the weight of the device 10 and an appropriate pressure from the user 60 to drill the ice fishing aperture 62; raising and withdrawing the device 10 after completing the drilling of the fishing aperture 62; using the assembled device 10 as a means of assisting in a safe walk from the desired location on the ice surface 61; cleaning, drying and disassembling the device 10; storing the cordless drill 20 and the ice drill portion of the device 10.

The method of utilizing the first alternate device 30 may be achieved by performing the following additional steps: inserting the drive end 36 of the drive shaft 35 thereinto the drive socket 34; securing the assembly by inserting the pin 38 thereinto the pin aperture 37.

The method of utilizing the second alternate device 40 may be achieved by performing the following additional steps: attaching the knife edge insert 43 thereonto the front face portion of the alternate spade 41, and the tooth edge insert 44 thereonto the rear face portion of the alternate spade 41, if not already attached.

The method of utilizing the third alternate device 50 may be achieved by performing the additional steps which are similar to those performed for the second alternate device 40: attaching the knife edge insert 53 thereonto the front face portion of the first curvature 55 of the alternate spade 51; attaching the tooth edge insert 54 thereonto the front face portion of the second curvature 56 of the alternate spade 51, if not already attached.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A cordless drill assembly for drilling an aperture within an ice surface, said cordless drill assembly comprising:
   a shaft;
   a spade connected to said shaft;

a bit connected to said shaft and said spade respectively;
a cordless drill coupled to said shaft;
wherein said spade includes a knife edge and a toothed edge respectively formed therealong;
wherein said bit has a pointed lower portion welded to front and rear face portions of said spade, said lower portion adapted to punch an aperture in the ice surface;
wherein an entire longitudinal length of said knife edge is linear and registered perpendicular to a longitudinal length of said shaft;
wherein said toothed edge extends oppositely away from said knife edge;
a splash shield attached to said shaft; and
a fastener attached to said shaft and said splash shield respectively.

2. The cordless drill assembly of claim 1, wherein an upper end portion of said shaft comprises:
a hexagonal end for providing a positive grip to said cordless drill; and,
a lower end portion of said shaft is provided with a slot for achieving a tight fit over said spade.

3. The cordless drill assembly of claim 2, wherein said shaft straddles an upper portion of said spade.

4. A cordless drill assembly for drilling an aperture within an ice surface, said cordless drill assembly comprising:
a rectilinear shaft;
a spade connected to said shaft;
a bit connected to said shaft and said spade respectively;
a cordless drill removably coupled to said shaft;
wherein said spade includes a knife edge and a toothed edge respectively formed therealong;
wherein said bit has a pointed lower portion welded to front and rear face portions of said spade, said lower portion adapted to punch an aperture in the ice surface;
wherein an entire longitudinal length of said knife edge is linear and registered perpendicular to a longitudinal length of said shaft;
wherein said toothed edge extends oppositely away from said knife edge;
a splash shield attached to said shaft; and
a fastener attached to said shaft and said splash shield respectively.

5. The cordless drill assembly of claim 4, wherein an upper end portion of said shaft comprises:
a hexagonal end for providing a positive grip to said cordless drill; and,
a lower end portion of said shaft is provided with a slot for achieving a tight fit over said spade.

6. The cordless drill assembly of claim 5, wherein said shaft straddles an upper portion of said spade.

7. A method of utilizing a cordless drill assembly for drilling an aperture within an ice surface, said method comprising the steps of:
providing a rectilinear shaft;
providing a spade having a knife edge and a toothed edge respectively formed therealong, wherein an entire longitudinal length of said knife edge is linear and registered perpendicular to a longitudinal length of said shaft and wherein said toothed edge extends oppositely away from said knife edge;
connecting said spade to said shaft;
providing and connecting a bit to said shaft and said spade respectively by welding a pointed lower portion of said bit to front and rear face portions of said spade;
providing and removably coupling a cordless drill to said shaft; and,
said lower portion of said bit punching an aperture in the ice surface;
providing a splash shield attached to said shaft; and
a fastener attached to said shaft and said splash shield respectively.

* * * * *